April 7, 1936.     H. G. WIEST     2,036,786
CONSTANT CURRENT TRANSFORMER
Filed March 1, 1935
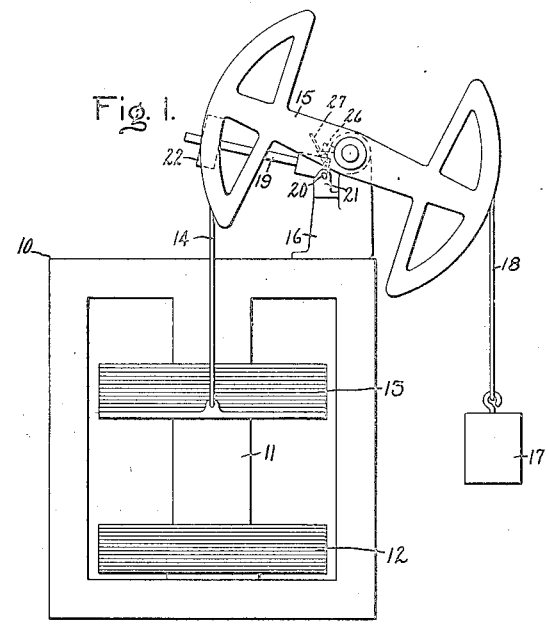
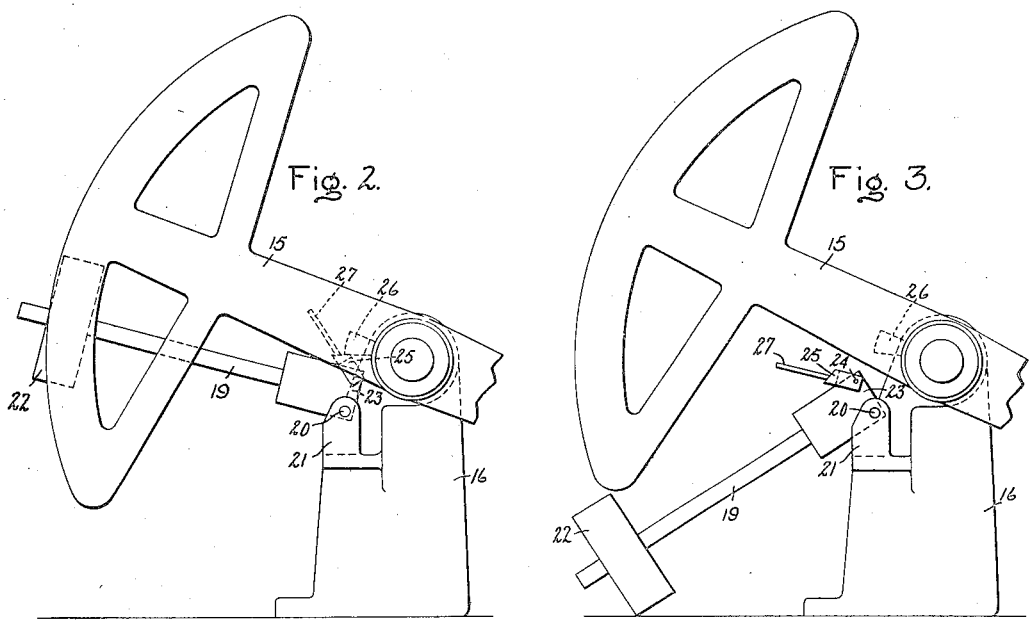
Inventor:
Horace G. Wiest,
by Harry E. Dunham
His Attorney.

Patented Apr. 7, 1936

2,036,786

UNITED STATES PATENT OFFICE 2,036,786

CONSTANT CURRENT TRANSFORMER

Horace G. Wiest, West Lynn, Mass., assignor to General Electric Company, a corporation of New York Application March 1, 1935, Serial No. 8,875

2 Claims. (Cl. 171—119)

My invention relates to constant current transformers of the balanced movable winding type. In this type of transformer, at least one of the windings is movable so that the spacing of the windings and therefore the reactance of the transformer is variable. While the transformer is in operation, the movable winding is supported against the force of gravity by a suitable weight mechanism and by the magnetic repulsion between the two windings. The position of the movable winding is automatically determined to maintain constant the secondary current under varying load conditions. Such transformers are commonly used to supply current for lighting circuits and are therefore usually idle during the daytime. When idle there is no magnetic repulsion between the two windings and the windings are drawn close together by gravity. It is a characteristic of most lighting circuits that the resistance is very much lower when the lamps are cold than when they are lighted. Under these conditions, if normal primary voltage is applied to the primary winding of the transformer, an abnormally high secondary current will start to flow and the movable winding will be repelled violently. The abnormally high secondary current and the violent repulsion of the movable windings are very likely to cause injury to the transformer. It is possible to avoid these objectionable conditions by holding the windings apart either manually or by a suitable latch at the time that the primary winding is energized and then releasing the movable winding to allow it to assume a position determined by the weight mechanism and repulsion between the windings. It often happens, however, that the transformer is used in an automatic station without the presence of an attendant.

The general object of the invention is to provide an improved arrangement for holding the windings apart until the primary winding is energized and then automatically releasing the movable winding to permit it to assume the proper position corresponding to the desired secondary current.

The invention will be better understood from the following description taken in connection with the accompanying drawing, in which Fig. 1 is a side view of a movable winding constant current transformer provided with an automatic latching mechanism in accordance with the invention, Fig. 2 is an enlarged view of a portion of the transformer regulating mechanism and the automatic latching mechanism, and Fig. 3 is a view similar to that shown in Fig. 2 but with the latching mechanism in another position. Like reference characters indicate similar parts in the different figures of the drawing.

The transformer 10 shown in Fig. 1 includes a magnetic core 11 with a fixed winding 12 and a movable winding 13 surrounding the winding leg of the core. The movable winding 13 is supported by cables 14 from one end of a lever 15 pivotally supported on a bracket 16 secured to the transformer core. A weight 17 is supported by a cable 18 from the other end of the lever 15.

Under normal operating conditions, the weight 17 and the magnetic repulsion between the windings 12 and 13 just balance the effect of gravity on the movable winding 13. If the secondary circuit is opened and the transformer is idle, then there is no magnetic repulsion between the windings and the winding 13 will drop down close to the winding 12. The resistance of the lamps in the secondary circuit will also decrease. If the primary winding is now energized, magnetic repulsion between the windings will be very great and the movable winding 13 will be repelled violently away from the winding 12. The secondary current will also be abnormally high.

These objections may be prevented by the latching mechanism shown in the drawing. This latching mechanism includes a lever 19 secured at one end by a pivot 20 to a support 21 provided with a weight 22 at its other or outer end. The inner or pivot end 23 of the lever 19 forms one member of a toggle which is connected by a pivot 24 to the other toggle member 25. A projection or stop 26 is integral with or secured to the lever 15. Thus the toggle members 23 and 25 may engage the stop 26, as shown in Figs. 1 and 2 to hold the winding 13 away from the winding 12 while the transformer is not in operation. The weight 22 tends to break the toggle but is so adjusted that it cannot do so while the transformer is not in operation because of the pressure of the stop 26 on the outer end of the toggle member 25.

Now, if the primary winding is energized, the magnetic repulsion between the two windings 12 and 13 will substantially reduce the pressure of the stop 26 on the toggle member 25. The weight 22 will then break the toggle and release the stop 26, as shown in Fig. 3, to permit the movable winding 13 to assume the proper position to maintain the desired value of secondary current. Thus, there is no abnormal magnetic repulsion between the windings and no abnormally high current in the secondary circuit. The toggle member 25 may be provided with a pin 27 which may be used as a handle in adjusting the toggle and which will also strike the stop 26 and prevent the toggle member 25 from falling out of easy reach back of the other toggle member 23.

It is customary for an inspector to visit lighting transformers each day to keep them in good condition. During his visit, and while the transformer is not being operated, the inspector may adjust the automatic latching mechanism to hold the winding 13 in starting position. Then when the primary winding is energized later in the day the movable winding will be automatically released, as has been described, and the transformer will continue to operate until the supply of primary current is interrupted the next morning.

The invention provides a simple and reliable arrangement which operates entirely automatically and which will effectively prevent abnormal conditions and consequent injury during the starting of a movable winding constant current transformer.

What I claim as new and desire to secure by Letters Patent of the United States, is:

1. A constant current transformer having two windings, at least one of said windings being movable, means including a toggle for holding said movable winding in raised position against gravity, and means responsive to magnetic repulsion between said windings for breaking said toggle to release the movable winding.

2. A constant current transformer having two windings, at least one of said windings being movable, a lever, said movable winding being supported from one end of said lever, a weight supported from the other end of said lever, a stop secured to said lever, a toggle for engaging said stop to support said movable winding in raised position against gravity, and a weighted lever for breaking said toggle in response to magnetic repulsion between said windings to release the movable winding.

HORACE G. WIEST.